(12) United States Patent
Jones et al.

(10) Patent No.: US 11,565,761 B2
(45) Date of Patent: Jan. 31, 2023

(54) TRACK JOINT ASSEMBLY IN MACHINE TRACK HAVING PIN STOP FOR CARTRIDGE PIN RETENTION

(71) Applicant: Caterpillar Inc., Deerfield, IL (US)

(72) Inventors: Benjamin Jones, Bartonville, IL (US); Thomas Ellmann, Groveland, IL (US); Thomas Oertley, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 709 days.

(21) Appl. No.: 16/269,244

(22) Filed: Feb. 6, 2019

(65) Prior Publication Data

US 2020/0247489 A1    Aug. 6, 2020

(51) Int. Cl.
| | | |
|---|---|---|
| *B62D 55/21* | (2006.01) | |
| *B62D 55/092* | (2006.01) | |
| *B62D 55/15* | (2006.01) | |
| *B62D 55/32* | (2006.01) | |

(52) U.S. Cl.
CPC ........... *B62D 55/21* (2013.01); *B62D 55/092* (2013.01); *B62D 55/15* (2013.01); *B62D 55/32* (2013.01)

(58) Field of Classification Search
CPC .... B62D 55/21; B62D 55/205; B62D 55/092; B62D 55/15; B62D 55/32; B62D 55/0887
USPC ........................................................ 305/204
See application file for complete search history.

(56) References Cited

U.S. PATENT DOCUMENTS

| | | | | |
|---|---|---|---|---|
| 4,176,887 A | * | 12/1979 | Alpers ................... | B62D 55/15 305/202 |
| 5,257,858 A | | 11/1993 | Taft | |
| 6,290,313 B1 | | 9/2001 | Korpi | |
| 6,454,366 B1 | | 9/2002 | Egle | |
| 7,959,239 B2 | * | 6/2011 | Diekevers ............ | B62D 55/092 305/202 |
| 8,075,068 B2 | | 12/2011 | VanderVeen | |
| 2009/0110472 A1 | | 4/2009 | Liang et al. | |
| 2010/0209180 A1 | | 8/2010 | Hasselbusch et al. | |
| 2014/0306517 A1 | * | 10/2014 | Kita ...................... | B62D 55/32 305/204 |
| 2014/0319905 A1 | * | 10/2014 | Mathew ............... | F16J 15/3204 305/104 |
| 2015/0158536 A1 | | 6/2015 | Takagi | |
| 2016/0236734 A1 | | 8/2016 | Kita | |
| 2017/0050688 A1 | * | 2/2017 | Oertley .................. | B62D 55/21 |
| 2017/0057572 A1 | * | 3/2017 | Hakes .................... | B62D 55/21 |

FOREIGN PATENT DOCUMENTS

| | | | | |
|---|---|---|---|---|
| CN | 206049843 | | 3/2017 | |
| CN | 106005074 | | 4/2019 | |
| JP | S61201985 | | 12/1986 | |
| JP | H10129546 | | 5/1998 | |
| WO | 2014136290 | | 9/2014 | |
| WO | 2017040000 | | 3/2017 | |
| WO | WO-2017068687 A1 | * | 4/2017 | ............. B62D 55/21 |

* cited by examiner

*Primary Examiner* — Scott A Browne

(74) *Attorney, Agent, or Firm* — Brannon Sowers & Cracraft

(57) ABSTRACT

A track joint assembly includes a first track shoe and a second track shoe, and a cartridge pin coupling together the first track shoe and the second track shoe. A sealed and lubricated track joint is formed by pin lugs on the first and the second track shoes, a cartridge pin, a pin retainer, a pin bore extending through pin lugs of the coupled-together track shoes, and a pin stop located in one of the pin lugs to inhibit displacement of the cartridge pin.

20 Claims, 3 Drawing Sheets

TRACK JOINT ASSEMBLY IN MACHINE TRACK HAVING PIN STOP FOR CARTRIDGE PIN RETENTION

TECHNICAL FIELD

The present disclosure relates generally to a track joint assembly for a machine track, and more particularly to a track shoe having a pin stop and a pin retainer for trapping and supporting of a cartridge pin in a sealed and lubricated track joint.

BACKGROUND

Ground-engaging tracks are used in many different machines operated in off-highway environments across the globe. Machine tracks typically include an endless loop of coupled-together track links that extends about rotatable track-engaging elements such as one or more idlers, track rollers, carrier rollers, and a drive sprocket. Significant engineering efforts have been directed over the years at design of various track system components to provide robust support for heavy machines, as well as traction in harsh environments. Track-type machines can weigh several million pounds, and off-highway worksites can have substrates formed of hard materials that subject the equipment to demanding wear conditions, slippery underfoot conditions, repeated high mechanical loads, and corrosive environments. Various specialized materials, lubrication fluids, as well as shape and proportioning of track components have been proposed over the years to address these and other concerns.

In the case of large mining machines, track service can require significant machine downtime during which the machine is not operational, and heavy equipment as well as specially trained personnel may be necessary to properly inspect, repair, replace, or otherwise diagnose and address issues with a machine's track. Machine downtime can have significant economic consequences, especially in the event of an unplanned field failure. United States Patent Application Publication No. 2017/0050688 to Oertley et al. is directed to a cartridge assembly for a track chain. The cartridge assembly includes a bushing and a track pin, and is structured such that the cartridge assembly is rotatable with respect to the supporting bores. While Oertley et al. discloses a design that may be well suited for certain applications, there is always room for improvement and/or alternative strategies.

SUMMARY OF THE INVENTION

In one aspect, a track joint assembly includes a first track shoe including a first ground pad having a lower side with a ground-contact surface, an upper side, and a plurality of forward pin lugs upon the upper side and defining a lug space. The track joint assembly further includes a second track shoe with a second ground pad having a lower side with a ground-contact surface, an upper side, and a back pin lug upon the upper side and positioned within the lug space. A cartridge pin couples the first track shoe to the second track shoe, and a pin retainer is positioned at least partially within a first one of the plurality of forward pin lugs. The track joint assembly further includes a pin stop positioned at least partially within a second one of the plurality of forward pin lugs, and a track joint is formed by the plurality of forward pin lugs, the back pin lug, the cartridge pin, and pin bore. The pin bore extends through the first one of the plurality of forward pin lugs, the second one of the plurality of forward pin lugs, and the back pin lug. The cartridge pin is inserted through the pin bore and trapped between the pin stop and the pin retainer.

In another aspect, a machine track includes a first track shoe having a first set of forward pin lugs and second set of forward pin lugs, and a second track show shoe including a first back pin lug and a second back pin lug. A first pin bore extends through the first set of forward pin lugs and the first back pin lug and has a first pin stop located therein. A first cartridge pin is positioned within the first pin bore. A second pin bore extends through the second set of forward pin lugs and the second back pin lug and has a second pin stop located therein. A second cartridge pin is positioned within the second pin bore. The machine track still further includes a first pin retainer trapping the first cartridge pin within the first pin bore in contact with the first pin stop, and a second pin retainer trapping the second cartridge pin within the second pin bore in contact with the second pin stop.

In still another aspect, a sealed and lubricated track joint includes a first forward pin lug and a second forward pin lug forming a lug space therebetween. The track joint further includes a back pin lug positioned within the lug space. A pin bore including a pin installation end is formed in the first forward pin lug and includes a second end formed in the second forward pin lug, and a middle section formed in the back pin lug. The track joint also includes a pin retainer positioned at least partially within the first one of the plurality of forward pin lugs, a pin stop positioned at least partially within the second one of the plurality of forward pin lugs, and a cartridge pin. The cartridge pin is inserted through the pin bore and trapped between the pin stop and the pin retainer to rotatably couple a first track shoe including the first forward pin lug and the second forward pin lug to a second track shoe including the back pin lug.

DETAILED DESCRIPTION

Figure 1:
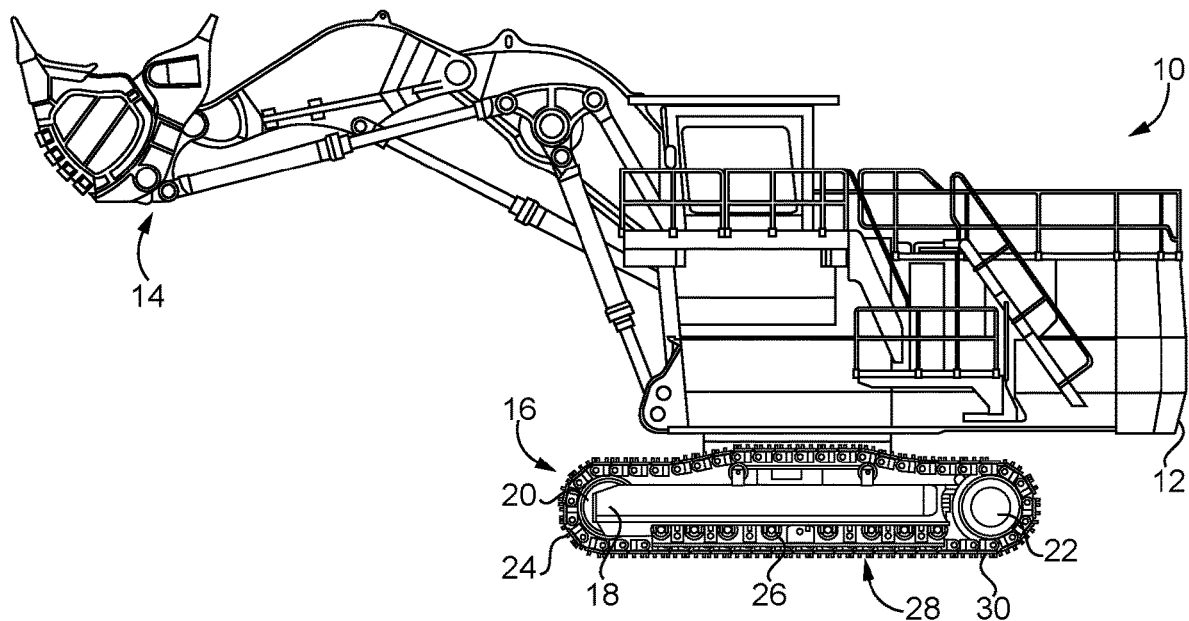
FIG. 1 is a side diagrammatic view of a machine having a machine track, according to one embodiment.

Referring to FIG. 1, there is shown a machine 10, according to one embodiment. Machine 10 includes a track-type machine having a machine frame 12, and an implement system 14 coupled to frame 12. Frame 12 may be supported on and rotatable relative to a ground-engaging track system 16. Track system 16 includes a track roller frame 18, an idler 20, a drive sprocket 22, and a plurality of track rollers 26 mounted to track roller frame 18. A ground-engaging track 24 extends about idler 20, drive sprocket 22, track rollers 26, and potentially other rotatable track-engaging elements. Machine 10 is shown in the context of a mining machine, namely, a hydraulic mining shovel or the like where implement system 14 includes a hydraulically actuated implement system structured to operate at least primarily at a working face of a mine. Machine 10 could alternatively be a rope shovel, such as an electric rope shovel, or a variety of other types of equipment such as a tractor or an excavator. Those skilled in the art will appreciate that certain mining machines, such as the illustrated hydraulic mining shovel, may be operated 90% of the time or more at fixed locations at a worksite, such as at a working face to capture, lift, and dump material into mining trucks or another conveyance mechanism, and thus are trammed only a minority of the time. Such mining machines can weigh up to 3 million pounds, or more, and despite the relative infrequency of tramming can subject their tracks to extreme wear, loading, and material deformation, for instance. It is generally desirable for tracks in such machines to have a service life in the tens of thousands of hours. As further discussed herein, machine 10, and track system 16 in particular, is structured for a service life and operational reliability, particularly with respect to track joints further discussed herein, that is extended relative to other strategies, with a reduced risk of premature failure or necessity for unexpected field service and machine downtime.

Figure 2:
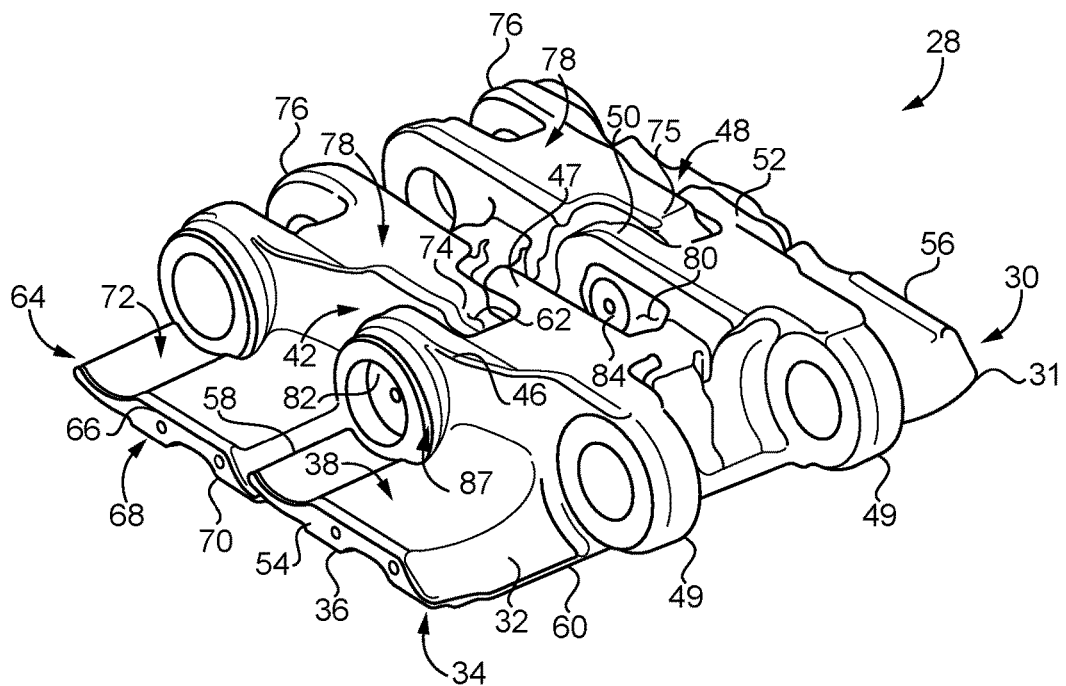
FIG. 2 is a perspective view of a track joint assembly, according to one embodiment.

Referring also now to FIG. 2, there is shown a track joint assembly 28 as might be used in machine track 24. Track joint assembly 28 includes a first track shoe 30 having a one-piece shoe body 31, and including a first ground pad 32 having a lower side 34 with a ground-contact surface 36, an upper side 38, and a plurality of forward pin lugs upon upper side 38 and defining a lug space 62. The plurality of forward pin lugs may be arranged in a first set of forward pin lugs 42 and a second set of forward pin lugs 48. First set of forward pin lugs (hereinafter "first set 42") can include a first forward pin lug 46 and a second forward pin lug 47. Track shoe 30 also includes a back pin lug 49 upon upper side 38, and associated with first set 42. Second set of forward pin lugs (hereinafter "second set 47") can include a first forward pin lug 50 and a second forward pin lug 52. Another back pin lug, also shown with reference numeral 49, is also positioned upon upper side 38, and associated with second set 48. The terms "forward" and "back" and similar relative terms are used herein only for convenience, and should not be taken to mean a specific orientation within machine track 24. Analogously, the terms "first" and "second," et cetera, are used for ease of description and do not require any particular ordering, arrangement, or other characteristic.

Track joint assembly 28 further includes a second track shoe 64 including a second ground pad 66 having a lower side 68 with a ground-contact surface 70, an upper side 72, and each of a first back pin lug 74 and a second back pin lug 75 upon upper side 72. Second track shoe 64 will also be understood to include a one-piece shoe body (not numbered), and a plurality of forward pin lugs shown with reference numeral 76. Back pin lug 74 is positioned within lug space 62, whereas back pin lug 75 may be positioned within a similar lug space defined by second set 48. It will be appreciated further that first track shoe 30 and second track shoe 64 may be substantially identical. Accordingly, discussion herein of any feature of one of track shoes 30 or 64 can be understood to refer by way of analogy to corresponding features of the other of track shoes 30 and 64. First track shoe 30 and second track shoe 64 further form two parallel roller rails 78 structured to contact track rollers 26 in a generally known manner. A sprocket tooth space 80 extends between first set 42 and second set 48 and is structured to receive teeth of drive sprocket 22, again in a generally known manner.

Ground pad 32 further includes a first outboard edge 54, a second outboard edge 56, a forward edge 58, and a back edge 60. It can be noted that first set 42 and second set 48 of forward pin lugs extend forwardly of forward edge 58, and that back pin lugs 49 extend rewardly of back edge 60. Track joint assembly 28 further includes a cartridge pin 82 coupling first track shoe 30 to second track shoe 64, and can include a second cartridge pin 84 also coupling first track shoe 30 to second track shoe 64. As further discussed herein, it has been observed in certain known track systems that pins, such as cartridge pins, and other types of pins, can "walk" out of a desired position over the course of a service life, necessitating field service of the track, premature pin replacement, or causing other problems. Pins can also experience bending loads and/or axial loads that have frustrated other concepts attempting to provide sealed and lubricated track joints in the past, as seals within a cartridge pin that is flexed or subjected to high axial loads might be damaged, distorted, or deformed in such a way that leakage of lubricant could occur. As will be further apparent from the following description, machine track 24, and track joint assembly 28 in particular is structured with uniquely configured pin-retention mechanisms to address these and other undesired phenomena.

Figure 3:
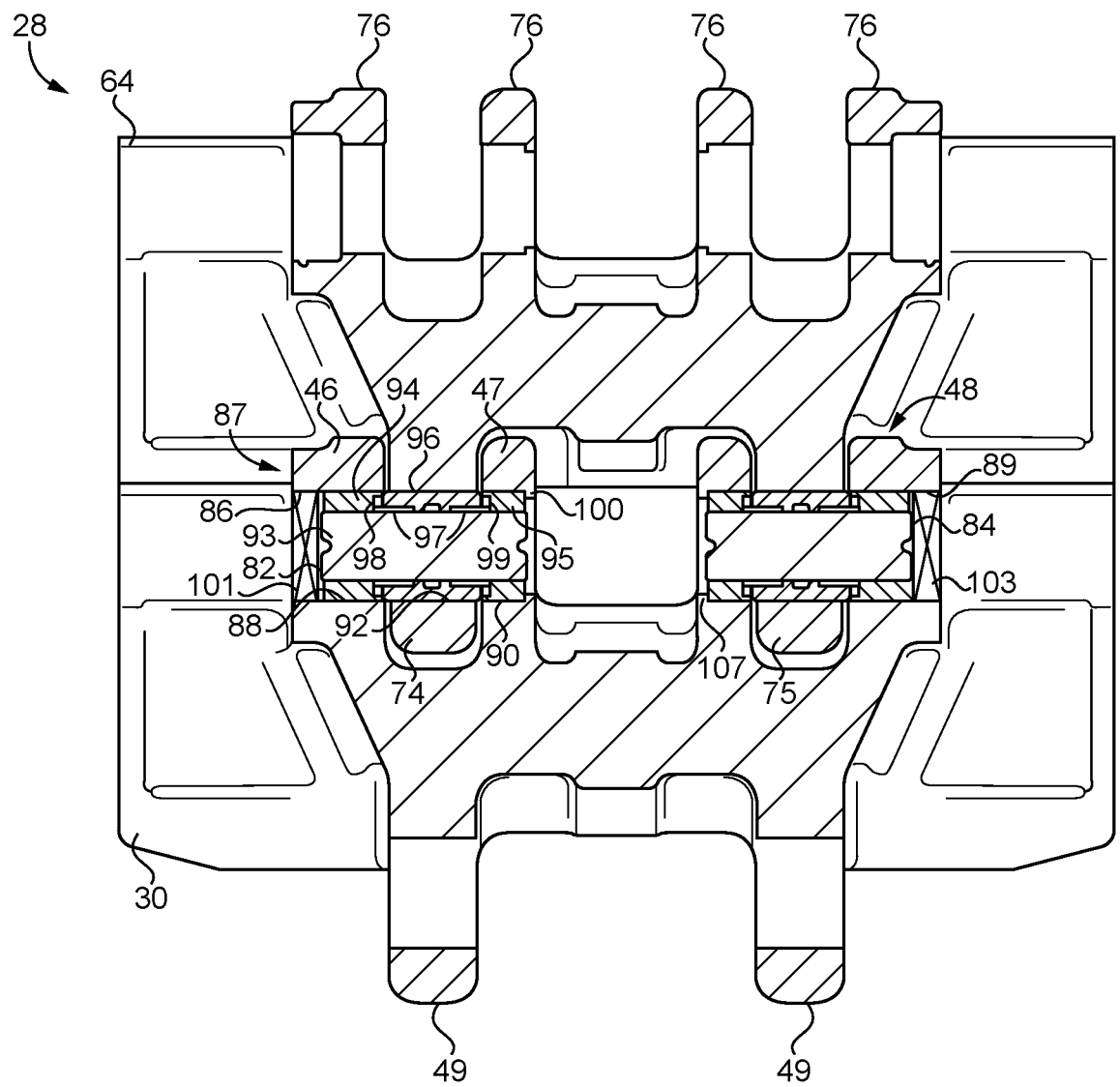
FIG. 3 is a sectioned view through the track joint assembly of FIG. 2.

Referring also now to FIG. 3, there is shown a sectioned view through track joint assembly 28 illustrating additional features. Track joint assembly 28 includes a sealed and lubricated track joint 87 formed by the plurality of forward pin lugs of first set 42, corresponding back pin lug 74, cartridge pin 82, and a pin bore 86. Track joint assembly 28 could be understood to include two track joints, including another that includes second set 48, back lug 75, and cartridge pin 84, however, the two track joints can be understood to function together and could also be described as a single joint. Various track shoe and track joint configurations are also contemplated herein that utilize a different number or arrangement of forward pin lugs and back pin lugs, for example. A track could also be structured with only one set of forward pin lugs and one back pin lug on adjacent track shoes, respectively, together comprising a track joint. Accordingly, description of track joint 87 can be understood to refer to a single track joint formed by one cooperating set of forward pin lugs, a back pin lug, and a cartridge pin, or to a compound track joint formed by multiple sets of forward pin lugs, multiple back pin lugs, and multiple cartridge pins. Pin bore 86 includes a pin installation end 88 within a first one of the plurality of forward pin lugs, in the illustrated case the left-hand pin lug 46 of first set 42, a second end 90 within a second one of the plurality of forward pin lugs, in FIG. 3 pin lug 47, and a middle section 92 within back pin lug 74. A second pin bore 89 receives second cartridge pin 84. Track joint 87 further includes a pin stop 100 positioned at least partially within the second one 47 of the plurality of forward pin lugs, and within pin bore 86. Cartridge pin 82 is inserted through pin bore 86 and contacts pin stop 100 to inhibit displacement of cartridge pin 82 past pin stop 100. Pin bore 89 has another pin stop 107 therein. Track joint assembly 28 and track joint 87, further includes a first pin retainer 101 and second pin retainer 103. Cartridge pins 82 and 84 are trapped between pin stops 100 and 107 and pin retainers 101 and 103, respectively.

As noted, pin bore 86 includes a pin installation end 88 and a second end 90 having a different shape, size, surface features, or other characteristics than pin installation end 88. A pin installation end as described herein means an end of a pin bore structured for insertion of a cartridge pin, where another end of the pin bore is not thusly structured. In an implementation, pin stop 100 is formed integrally with one-piece shoe body 31 of track shoe 30, in particular with the second one of the plurality of forward pin lugs, namely, forward pin lug 46 in the illustrated embodiment. In a refinement, pin stop 100 can include an inwardly projecting wall forming forward pin lug 47. In alternative embodiments, pin stop 100 might be formed as a piece or part that is not integral with a pin lug, such as an inserted retention pin, a set screw, a snap ring, a threaded-in rod or nut, a weld, or still another mechanism. In the illustrated embodiment, the inwardly projecting wall of pin stop 100 extends circumferentially around an opening 114 to second end 90 of pin bore 86.

Figures 4, 5:
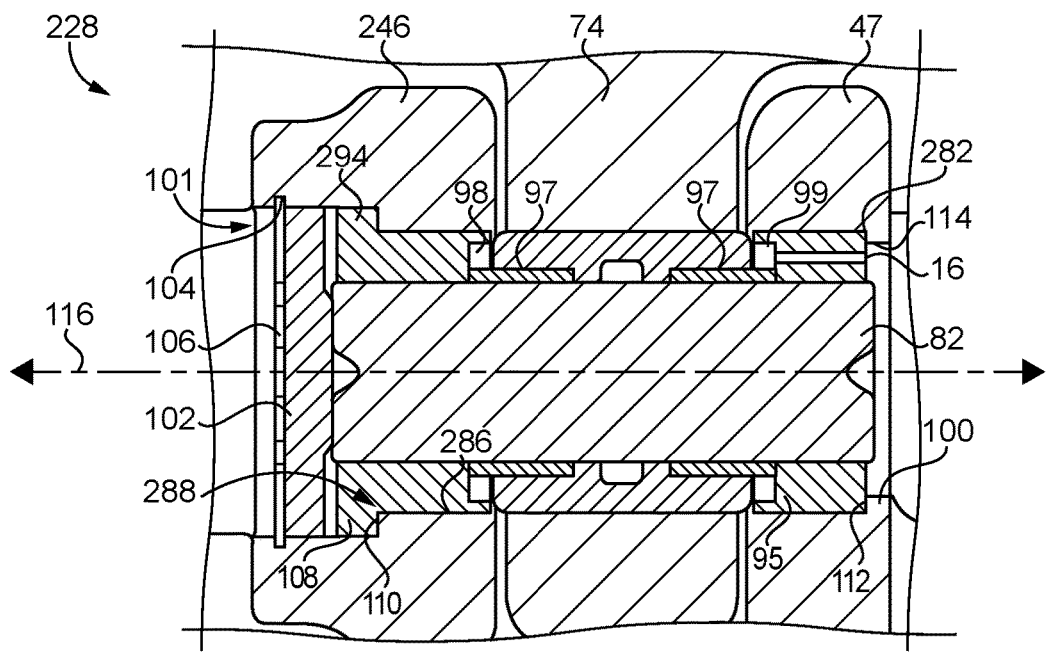
FIG. 4 is a sectioned view through a track joint assembly, according to another embodiment.
FIG. 5 is a sectioned view through a track joint assembly, according to yet another embodiment.

Referring also now to FIG. 4, there are shown features of a track joint assembly 228 having many similarities to track joint assembly 28, but certain differences. In FIG. 4, reference numerals alike to those used in FIGS. 1-3 are used to identify features that are the same or similar in structure or function. A cartridge pin 282 is slip-fitted within a pin bore 28 and can include a pin 93, a first collar 294, a second collar 95 in contact with pin stop 100, and a bushing 96 positioned upon pin 93 axially between first collar 294 and second collar 95. A plurality of sleeve bearings 97 are positioned between bushing 96 and pin 93. Cartridge pin 282 may further include a first seal 98 positioned axially between first collar 294 and bushing 96, and a second seal 99 positioned axially between second collar 95 and bushing 96. Each of seal 98 and 99 includes a lip seal, or a face seal potentially, held in compression between the corresponding first collar 294 or a second collar 95, and bushing 96. Pin 93 may be a solid pin. At least one of first collar 294 or second collar 95 can include a fluid port 91 for introducing a lubricating fluid into cartridge pin 82. Fluid port 91 could be formed elsewhere such as through pin 93. In the illustrated embodiment fluid port 91 is formed in second collar 95. First collar 294 and second collar 95 may each be interference fitted, such as by press fitting or freeze fitting, upon pin 93. Cartridge pin 282 may be slip-fitted within pin bore 286. It will be appreciated that cartridge pin 282 is in contact with and supported along an entirety of its axial length by pin lugs 46,47 and 74. Cartridge pin 282 defines a longitudinal axis 116 which may be colinear with a longitudinal center axis of pin bore 286.

Also in the embodiment of FIG. 4, first collar 294 includes an outwardly projecting flange 108. A pin installation end 288 is formed in a forward pin lug 246 and includes a step 110 contacted by outwardly projecting flange 108. Pin stop 100 may include a stop surface 112. It can be noted that pin installation end 288 would be understood to open in a direction of first outboard edge 54, and that pin stop 100 includes a stop surface 112 also facing the direction of first outboard edge 54, to contact cartridge pin 282 as inserted through pin installation end 288 of pin bore 286. Track joint assembly 228 still further includes a pin retainer 101 positioned at least partially within the first one of the plurality of forward pin lugs, as illustrated forward pin lug 246, and contacted by cartridge pin 282. Pin retainer 101 may include a spacer 102 and a spring 106, such as a snap ring. A spring groove 104 is formed in pin bore 286 adjacent to pin installation end 288, such that spring 106 can be compressed and reduced in diameter, positioned in axial alignment with spring groove 104, and then permitted to expand to seat within spring groove 104 and thereby hold spacer 102 in contact with cartridge pin 82. Spring 106 can also be understood to include a spring-biased state, and a release state and is held in the spring-biased state within pin lug 246.

Turning now to FIG. 5, there is shown another track joint assembly 128 according to another embodiment and illustrating certain alternative features of the present disclosure. Track joint assembly 128 includes a track joint 186 in a machine track 124. Track joint assembly 128 also includes a cartridge pin 182 trapped between a pin retainer 201 and a pin stop 200. In contrast to cartridge pin 282, it can be noted that cartridge pin 182 includes a bushing 196 positioned upon a pin 193 axially between a first collar 194 and a second collar 195 and not supported upon sleeve bearings or the like. Instead, bushing 196 includes an inner bushing surface 197 that rides directly upon an outer pin surface 199 of a pin 191, and has a full axial bushing length in contact with pin 193. A first thrust bearing 198 and second thrust bearing 193 positioned between bushing 196 and first collar 194 and second collar 195, respectively. Cartridge pin 182 may be a greased cartridge pin structured for grease lubrication, in contrast to use of an oil lubricant as might be the case with cartridge pin 282 and others discussed herein. It can also be noted that neither of first collar 194 nor second collar 195 is equipped with a projecting flange, and that cartridge pin 182 has a uniform outer diameter dimension formed by first collar 194, second collar 195, and bushing 196. It can also be noted that pin stop 200 is not formed integrally with a pin lug, but instead is shown received and retained by way of a threaded connection 205. It will be recalled that a variety of different pin stop designs are contemplated within the context of the present disclosure. Accordingly, instead of an integral pin stop, pin stop 200 might be installed by rotating pin stop 200 relative to the associated pin lug to achieve the threaded engagement. In still other approaches contemplated herein, pin stop 200 might be welded into place, or cartridge pin 182, namely collar 194, might be welded to pin stop 200 or an associated pin lug. Any of the features of any of the embodiments discussed herein could also be applied to other embodiments, in whole or in part. Accordingly, the pin stop configuration set forth in the embodiment of FIG. 5, the cartridge pin configuration, the flangeless collar configuration, or still other aspects of track joint assembly 128 could be used in track joint assembly 28, 228 or others, or swapped between or among any of the embodiments contemplated herein.

INDUSTRIAL APPLICABILITY

Referring to the drawings generally, machine track according to the present disclosure can be assembled as a plurality of separate track sections including multiple track shoes coupled together with track joints as described herein, which are then joined together to form the complete machine track during installation on a machine. It is contemplated that cartridge pins 82, 84, 182 and 282 can be installed in their corresponding pin bores 86, 87, 186, 286 by way of slip-fitting, and insertion from the corresponding pin installation end of the pin bore. As shown in FIG. 3, for example, cartridge pins 82 and 84 can be installed by insertion in an outboard-to-inboard direction. An outboard-to-in board direction can be understood as a direction toward a longitudinal midline of track joint assembly 28. Cartridge pins 82 and 84 will be installed in this manner and slipped in until they contact the corresponding pin stops 100 and 107. Pin retainers 101 and 103 can then be installed to trap cartridge pins 82 and 84 in place. Additional individual shoes or track joint assemblies can be added to the growing track until completion upon the machine.

In operation, track joint assembly 28 will rotate in machine track 20 as it is moved about the plurality of rotatable track-engaging elements, with bushing 96 and sleeve bearings 97 and collars 94 and 95 permitting relative rotation amongst the parts. Since collars 94 and 95 may be interference fitted upon pin 93, collars 94 and 95 may rotate relative to pin lugs 46 and 47, whereas bushing 96 and sleeve bearings 97 may rotate relative to pin lug 74 and also relative to pin 93. Over time, wear processes and potentially also corrosive processes, may cause bushing 96 to become substantially fixed relative to pin lug 74, but continuing to rotate relative to sleeve bearings 97 and pin 93. Lubricant fluid delivered by way of fluid port 114 and sealed within cartridge pin 82 can facilitate such internal rotation.

As discussed above, in certain earlier designs pin retention issues, and pin bending or other displacement has created challenges to maintaining sealing of a cartridge pin and associated track joint. In view of the teachings herein it will be appreciated that hard stops against which cartridge pin 82 can bear and provided by pin retainer 101 and pin stop 100 can maintain cartridge pin 82 at a desired location, inhibit walking of cartridge pin 82 out of place, and help preserve seal integrity. The other cartridge pin and track joint embodiments contemplated herein can be expected to function in a generally analogous manner.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A track joint assembly comprising:
   a first track shoe including a first ground pad having a lower side with a ground-contact surface, an upper side, a forward edge, and a plurality of forward pin lugs upon the upper side projecting forwardly of the forward edge and defining a lug space;
   a second track shoe including a second ground pad having a lower side with a ground-contact surface, an upper side, and a back pin lug upon the upper side and positioned within the lug space;
   a cartridge pin coupling the first track shoe to the second track shoe, the cartridge pin having a first end face and a second end face each extending circumferentially around a longitudinal axis, and a uniform outer diameter dimension from the first end face to the second end face;
   a pin retainer positioned at least partially within a first one of the plurality of forward pin lugs;
   a pin stop positioned at least partially within a second one of the plurality of forward pin lugs;
   a track joint formed by the plurality of forward pin lugs, the back pin lug, the cartridge pin, and a pin bore extending through the first one of the plurality of forward pin lugs, the second one of the plurality of forward pin lugs, and the back pin lug;
   the cartridge pin is inserted through the pin bore and trapped between the pin stop and the pin retainer;
   a bushing;
   a first seal disposed within a bore defined by at least one of the forward pin lugs; and
   the bushing is configured to compress the seal.

2. The track joint assembly of claim 1 wherein the pin stop is formed integrally with the second one of the plurality of forward pin lugs.

3. The track joint assembly of claim 2 wherein the pin stop includes an inwardly projecting wall of the second one of the plurality of forward pin lugs.

4. The track joint assembly of claim 1 wherein:
   the cartridge pin includes a pin, a first collar in contact with the pin retainer, a second collar in contact with the pin stop, and the bushing positioned upon the pin between the first collar and the second collar; and
   the first collar and the second collar are each interference fitted upon the pin, and the cartridge pin is slip-fitted within the pin bore.

5. The track joint assembly of claim 4 wherein:
   the first seal held in compression between the first collar and the bushing, and a second seal held in compression between the second collar and the bushing; and
   the pin is a solid pin and at least one of the first collar or the second collar includes a fluid port for introducing a lubricant into the cartridge pin.

6. The track joint assembly of claim 1 wherein the cartridge pin is rotatable relative to the plurality of forward pin lugs and the back pin lug.

7. The track joint assembly of claim 1 wherein the pin stop is threaded connected to the second one of the plurality of forward pin lugs.

8. The track joint assembly of claim 1 wherein the pin retainer includes a snap ring seated within the first one of the plurality of forward pin lugs, and a spacer positioned between the snap ring and the cartridge pin.

9. A machine track comprising:
   a first track shoe including a first set of forward pin lugs and a second set of forward pin lugs;
   a second track shoe including a first back pin lug and a second back pin lug;
   a first pin bore extending through the first set of forward pin lugs and the first back pin lug and having a first pin stop located therein;
   a first cartridge pin positioned within the first pin bore;
   a second pin bore extending through the second set of forward pin lugs and the second back pin lug and having a second pin stop located therein;
   a second cartridge pin positioned within the second pin bore;
   a first pin retainer at least partially within the first pin bore and trapping the first cartridge pin within the first pin bore in contact with the first pin stop;
   a second pin retainer at least partially within the second pin bore and trapping the second cartridge pin within the second pin bore in contact with the second pin stop;
   the first cartridge pin and the second cartridge pin each including a first end face and a second end face extending circumferentially around a longitudinal axis, and a uniform outer diameter dimension from the respective first end face to the respective second end face;
   a bushing;
   a first seal disposed within a bore defined by at least one of the forward pin lugs; and
   the bushing is configured to compress the seal.

10. The machine track of claim 9 wherein the first track shoe includes a one-piece body and each of the first pin stop and the second pin stop is formed integrally in the one-piece body.

11. The machine track of claim 9 wherein the first cartridge pin is slip-fitted within the first pin bore, and the second cartridge pin is slip-fitted within the second pin bore.

12. The machine track of claim 11 wherein each of the first cartridge pin and the second cartridge pin includes a solid pin, a first collar interference fitted upon the solid pin, a second collar interference fitted upon the solid pin, and the bushing positioned upon the pin between the first collar and the second collar.

13. The machine track of claim 12 wherein each of the first cartridge pin and the second cartridge pin further includes:
a first seal held in compression between the first collar and the bushing and a second seal held in compression between the second collar and the bushing; and
a first thrust bearing positioned between the first collar and the bushing and a second thrust bearing positioned between the second collar and the bushing.

14. The machine track of claim 9 wherein:
each of the first pin stop and the second pin stop includes an inwardly extending wall extending circumferentially around an opening to the corresponding first pin bore or second pin bore; and
each of the first pin retainer and the second pin retainer includes a snap ring seated within one of the plurality of forward pin lugs, and a spacer positioned between the snap ring and the corresponding first cartridge pin or second cartridge pin.

15. A sealed and lubricated track joint comprising:
a first forward pin lug and a second forward pin lug forming a lug space therebetween;
a back pin lug positioned within the lug space;
a pin bore including a pin installation end formed in the first forward pin lug, a second end formed in the second forward pin lug, and a middle section formed in the back pin lug;
a pin retainer positioned at least partially within the first one of the plurality of forward pin lugs;
a pin stop positioned at least partially within the second one of the plurality of forward pin lugs; and
a cartridge pin inserted through the pin bore and in contact with each of the pin retainer and the pin stop within the pin bore, such that the cartridge pin is trapped between the pin stop and the pin retainer, to rotatably couple a first track shoe including the first forward pin lug and the second forward pin lug to a second track shoe including the back pin lug;
wherein the cartridge pin defines a longitudinal axis and includes:
a pin including an outer pin surface;
a first collar interference fitted upon the pin;
a second collar interference fitted upon the pin; and
a bushing positioned between the first collar and the second collar, and including a first bushing end face, a second bushing end face, and an inner bushing surface having a full axial length, from the first bushing end face to the second bushing end face, in contact with the outer pin surface;
a first seal disposed within a bore defined by at least one of the forward pin lugs; and
the bushing is configured to compress the seal.

16. The track joint of claim 15 wherein the cartridge pin is slip-fitted within the pin bore.

17. The track joint of claim 16 wherein the cartridge pin includes:
the first seal held in compression between the first collar and the bushing; and
a second seal held in compression between the second collar and the bushing.

18. The track joint of claim 17 wherein at least one of the first collar or the second collar includes a fluid port for introducing a lubricant into the cartridge pin.

19. The track joint of claim 17 wherein the cartridge pin includes a greased cartridge pin.

20. The track joint of claim 15 wherein the pin stop is formed integrally with the second forward pin lug, and wherein the pin retainer has a spring-biased state, and a release state, and is held in the spring-biased state within the first forward pin lug.

* * * * *